US012284307B2

(12) United States Patent
Hong et al.

(10) Patent No.: US 12,284,307 B2
(45) Date of Patent: Apr. 22, 2025

(54) MOBILE TERMINAL

(71) Applicant: LG ELECTRONICS INC., Seoul (KR)

(72) Inventors: Sungchul Hong, Seoul (KR); Woojin Lee, Seoul (KR); Insu Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 357 days.

(21) Appl. No.: 17/757,186

(22) PCT Filed: Jan. 9, 2020

(86) PCT No.: PCT/KR2020/000361
§ 371 (c)(1),
(2) Date: Jun. 10, 2022

(87) PCT Pub. No.: WO2021/141158
PCT Pub. Date: Jul. 15, 2021

(65) Prior Publication Data
US 2023/0007112 A1    Jan. 5, 2023

(51) Int. Cl.
*H04M 1/02* (2006.01)
(52) U.S. Cl.
CPC ....... *H04M 1/0268* (2013.01); *H04M 1/0237* (2013.01)
(58) Field of Classification Search
CPC .......................... H04M 1/0237; H04M 1/0268
See application file for complete search history.

(56) References Cited

U.S. PATENT DOCUMENTS

| 9,557,771 | B2* | 1/2017 | Park | H04M 1/0237 |
| 10,944,853 | B2* | 3/2021 | Lee | H04M 1/185 |
| 11,016,532 | B2* | 5/2021 | Yang | H04M 1/0268 |
| 11,470,729 | B2* | 10/2022 | Kim | H04M 1/0237 |

(Continued)

FOREIGN PATENT DOCUMENTS

| KR | 10-2010-0057531 | 5/2010 |
| KR | 10-2016-0141255 | 12/2016 |

(Continued)

OTHER PUBLICATIONS

PCT International Application No. PCT/KR2020/000361, Written Opinion and International Search Report dated Oct. 8, 2020, 10 pages.

*Primary Examiner* — David Bilodeau
(74) *Attorney, Agent, or Firm* — LEE, HONG, DEGERMAN, KANG & WAIMEY

(57) ABSTRACT

A mobile terminal according to an embodiment may comprise: a first frame; a second frame which comprises a third rear part provided on the rear surface of the first frame and movable in a first direction and a first roller provided at the end of the third rear part in the first direction; a flexible display panel which is provided to surround the first roller; a driving part for driving the second frame in the first direction or a second direction opposite to the first direction from the first frame; and a side cover which comprises a first plate extending in the second direction from both sides of the first roller and a second plate moving forward and backward on the first plate.

11 Claims, 12 Drawing Sheets

(56) References Cited

U.S. PATENT DOCUMENTS

| | | | | |
|---|---|---|---|---|
| 2015/0153777 | A1* | 6/2015 | Liu | G06F 1/1643 |
| | | | | 345/173 |
| 2017/0212607 | A1* | 7/2017 | Yoon | G06F 3/147 |
| 2018/0103552 | A1* | 4/2018 | Seo | H05K 5/0017 |
| 2019/0261519 | A1* | 8/2019 | Park | H05K 1/118 |
| 2021/0117012 | A1* | 4/2021 | Kim | H04B 1/3827 |
| 2022/0311848 | A1* | 9/2022 | Delaporte | H04M 1/0268 |
| 2023/0017380 | A1* | 1/2023 | Kim | G06F 1/1652 |
| 2023/0124270 | A1* | 4/2023 | Ko | G06F 1/1624 |
| | | | | 700/275 |

FOREIGN PATENT DOCUMENTS

| | | |
|---|---|---|
| KR | 10-1784880 | 10/2017 |
| KR | 10-2018-0030301 | 3/2018 |
| KR | 10-2019-0001389 | 1/2019 |

\* cited by examiner (a)

(b)

(a)

(b)

(a)  (b)

(a)

(b)

(c)

(a)

(b)

(a)

(b)

(c)

MOBILE TERMINAL

CROSS-REFERENCE TO RELATED APPLICATIONS

This application is the National Stage filing under 35 U.S.C. 371 of International Application No. PCT/KR2020/000361, filed on Jan. 9, 2020, the contents of which is hereby incorporated by reference herein in its entirety.

TECHNICAL FIELD

The present disclosure relates to a mobile terminal with an extendable screen exposed from front.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with a ubiquitous computing environment. In other words, the display device has evolved into a smart device that enables connectivity to a network and continuous computing.

In recent years, a mobile terminal provides a larger screen to the user. The mobile terminal may be a foldable mobile terminal that provides a large screen folding in one direction or a rollable mobile terminal that provides a large screen expanded or reduced in one direction.

DISCLOSURE

Technical Problem

The present disclosure relates to a mobile terminal capable of expanding a screen exposed from front based on a roller, and the object of the present disclosure is to more easily implement hardware functions such as antenna and audio functions.

Technical Solution

In one aspect of the present disclosure, there is provided a mobile terminal. The mobile terminal may include: a first frame; a second frame including a third rear portion coupled to a rear surface of the first frame and configured to move in a first direction and a first roller disposed at an end of the third rear portion in the first direction; a third frame coupled to a rear face of the third rear portion and configured to move in the first direction; a flexible display panel surrounding the first roller, wherein one end thereof is disposed on a front surface of the first frame and another end thereof is disposed on the third frame; a driver configured to drive the second frame from the first frame in the first direction or in a second direction opposite to the first direction; and a side cover extending in the second direction from both sides of the first roller and having a front-rear width variable depending on a position of the second frame.

According to an embodiment, the side cover may include a first plate fixed to both sides of the first roller and a second plate configured to move forward and backward from the first plate.

According to an embodiment, when the second frame moves in the second direction, the second plate may be configured to move forward to overlap with the first plate. When the second frame moves in the second first direction, the second plate may be configured to move backward.

According to an embodiment, the first frame may include an inclined surface configured to guide the second plate forward when the second frame moves in the second direction.

According to an embodiment, the side cover may further include a spring member configured to elastically support the second plate backward.

According to an embodiment, a side portion of the first frame may include: a front side portion configured to overlap with the side cover when the second frame moves in the second direction; and a rear side portion configured not to overlap with the side cover.

According to an embodiment, the rear side portion may be made of metal, and the first frame may be provided with an antenna connected to the rear side portion.

According to an embodiment, the first frame may be provided with a speaker module configured to output sound through a conduit disposed in the rear side portion.

According to an embodiment, the first plate may include: a front portion disposed on an edge of the flexible display panel; and a side portion disposed perpendicular to the front portion and connected to the second plate.

According to an embodiment, the first frame may include a spiral spring connected to an end of the front portion in the second direction, unwound when the front portion moves in the first direction, and wound when the front portion moves in the second direction.

According to an embodiment, the spiral spring may be a constant force spring configured to provide a constant tension regardless of degree of unwinding.

According to an embodiment, an unwound part of the spiral spring is disposed on the edge of the flexible display panel.

Advantageous Effects

According to the present disclosure, the mobile terminal may output an image on a large screen by dividing the image based on two driving drivers, thereby preventing a user from recognizing difference in luminance.

According to the present disclosure, the mobile terminal may output an image on a large screen by dividing the image based on two driving drivers, thereby preventing a user from recognizing the parallax of the image output.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

The terminology used in the present disclosure is used only to describe specific embodiments, not intended to limit the present disclosure. A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
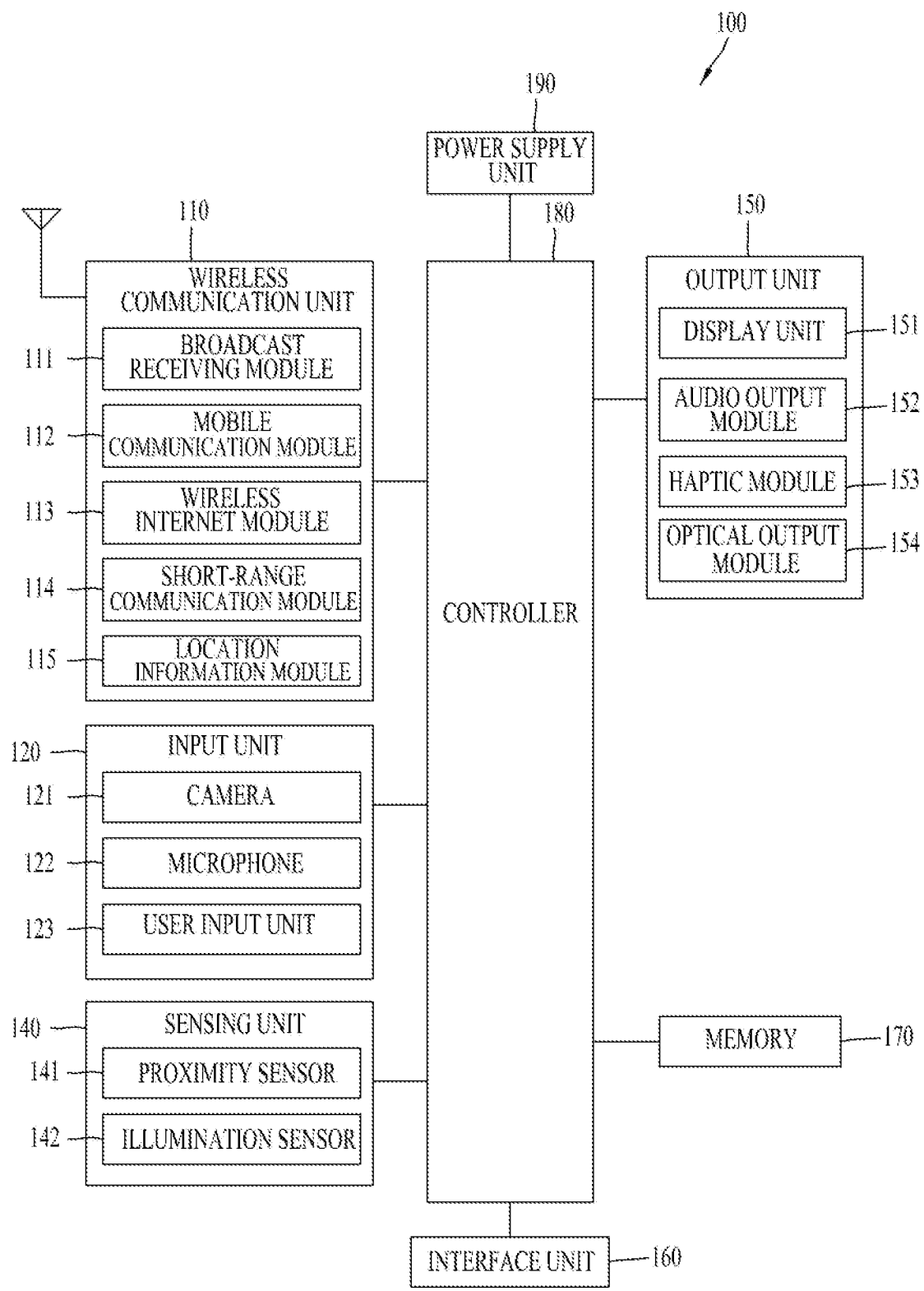
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
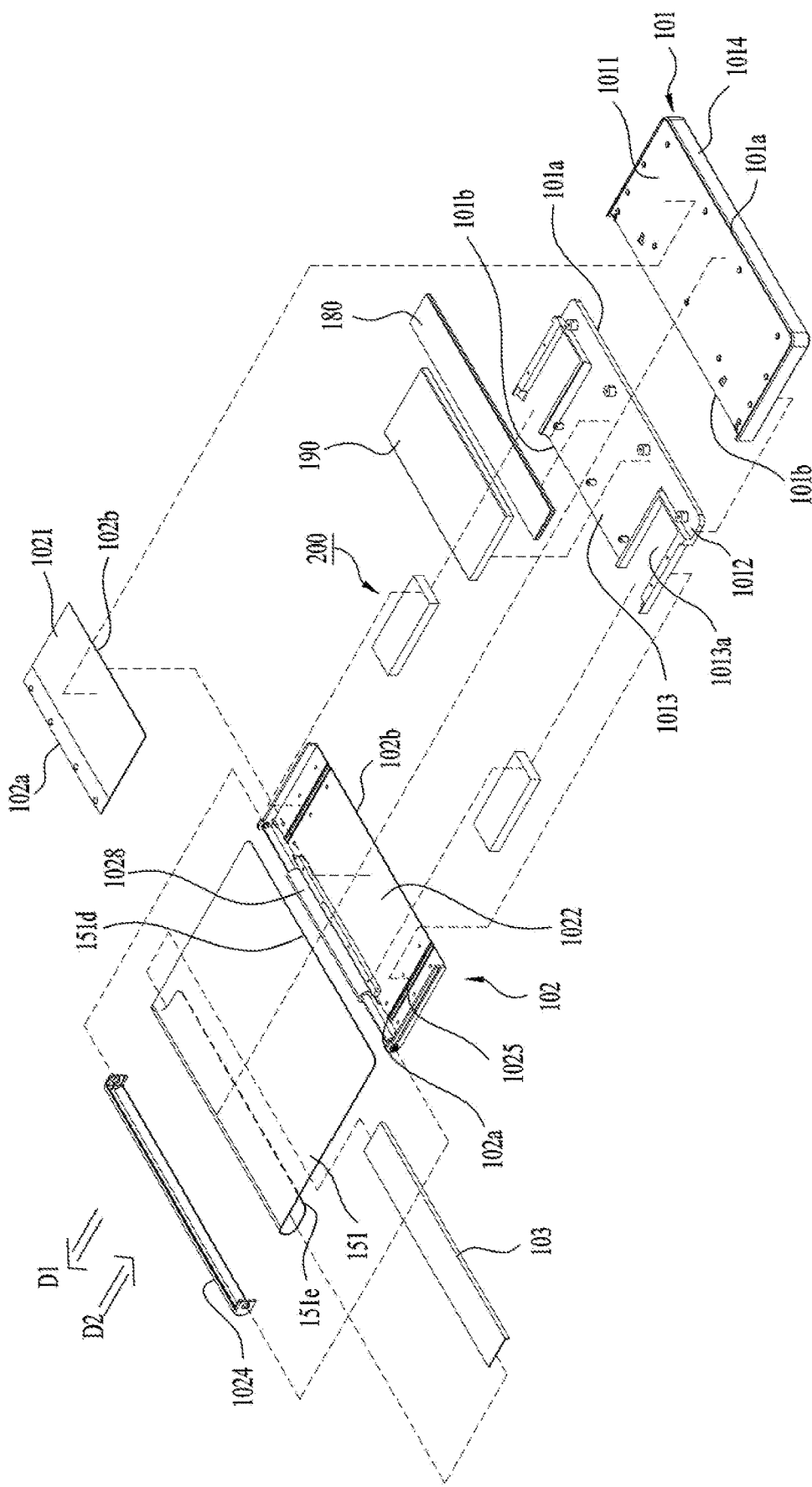
FIG. 2 is an exploded perspective view of a mobile terminal according to one embodiment.
Figure 3:
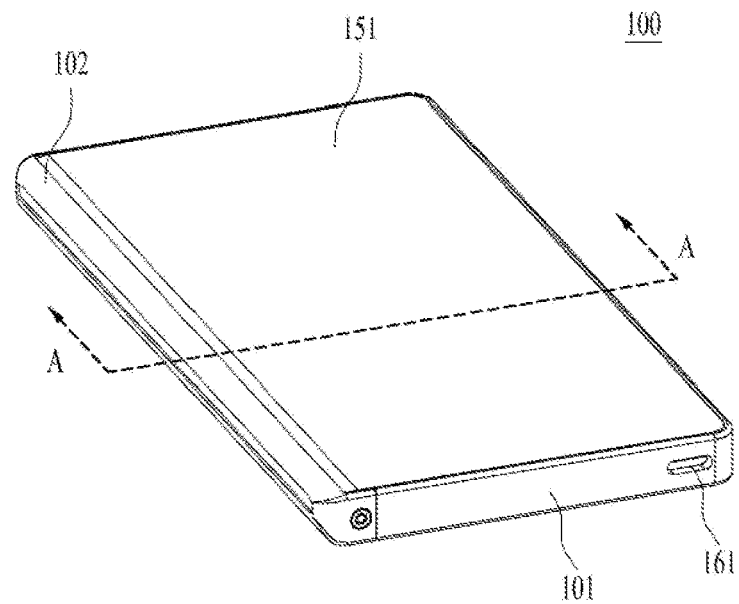
FIG. 3 shows perspective views respectively illustrating a first state and a second state viewed from one side of a mobile terminal according to one embodiment.
Figure 3:
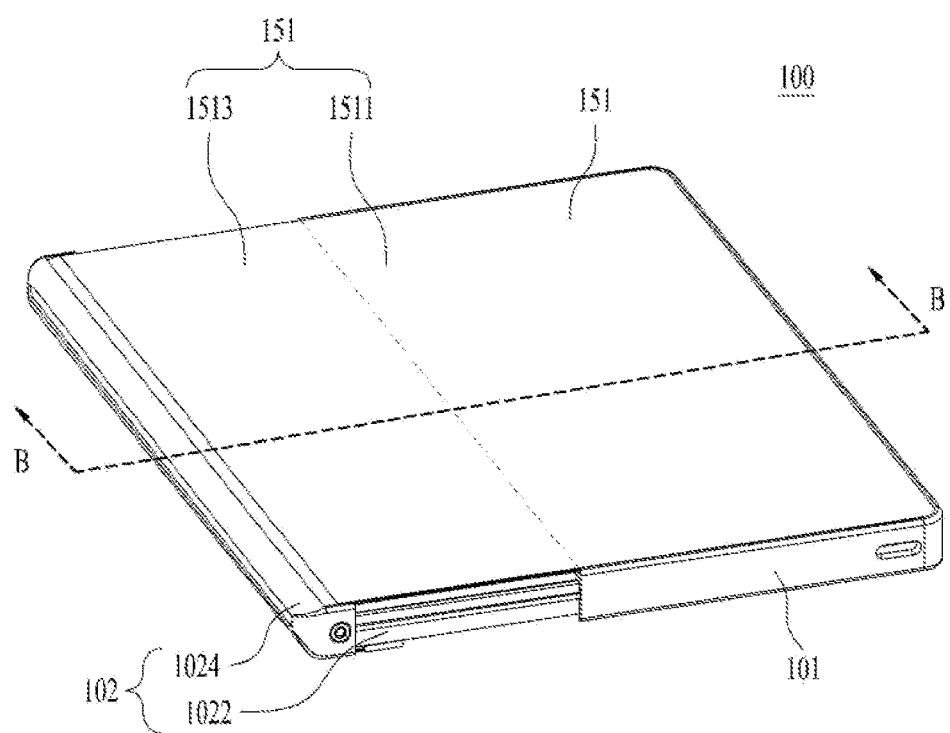
Figure 4:
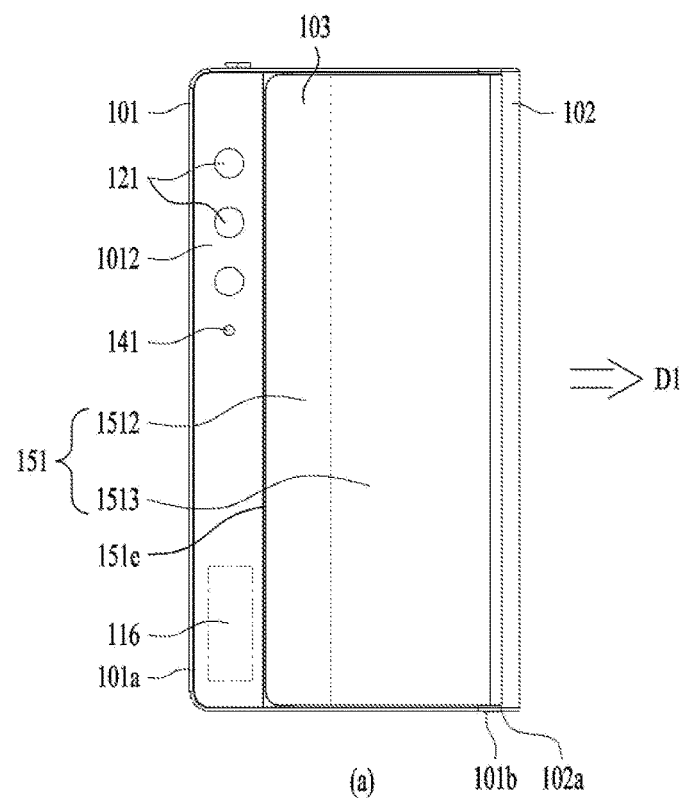
FIG. 4 shows rear face views respectively illustrating a first state and a second state of a mobile terminal according to one embodiment.
Figure 4:
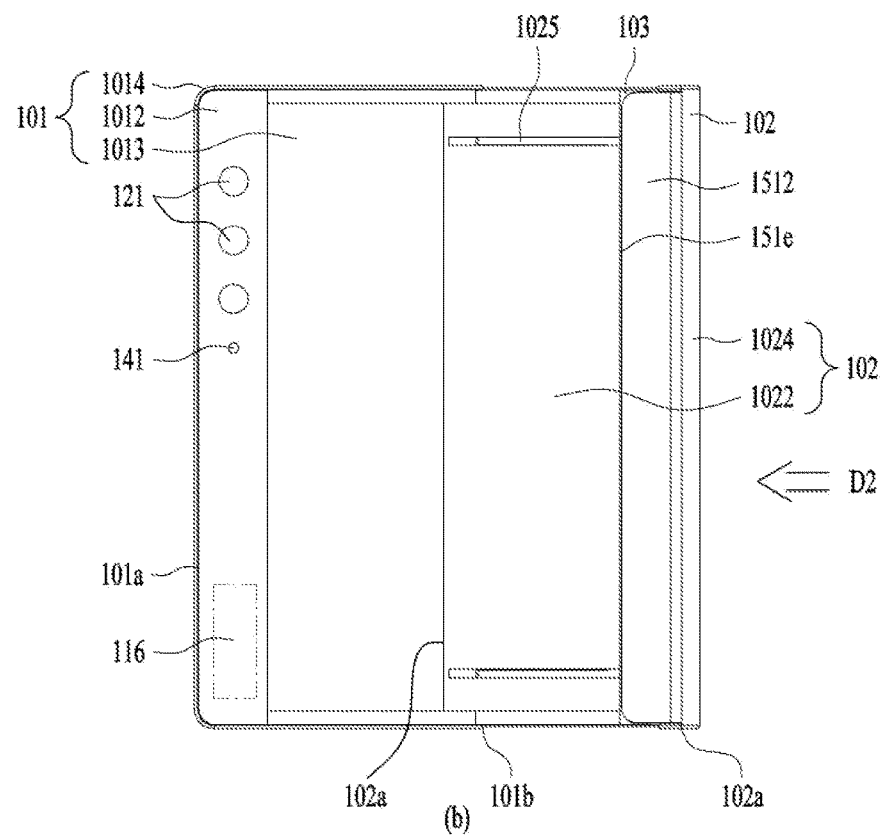
Figure 5:
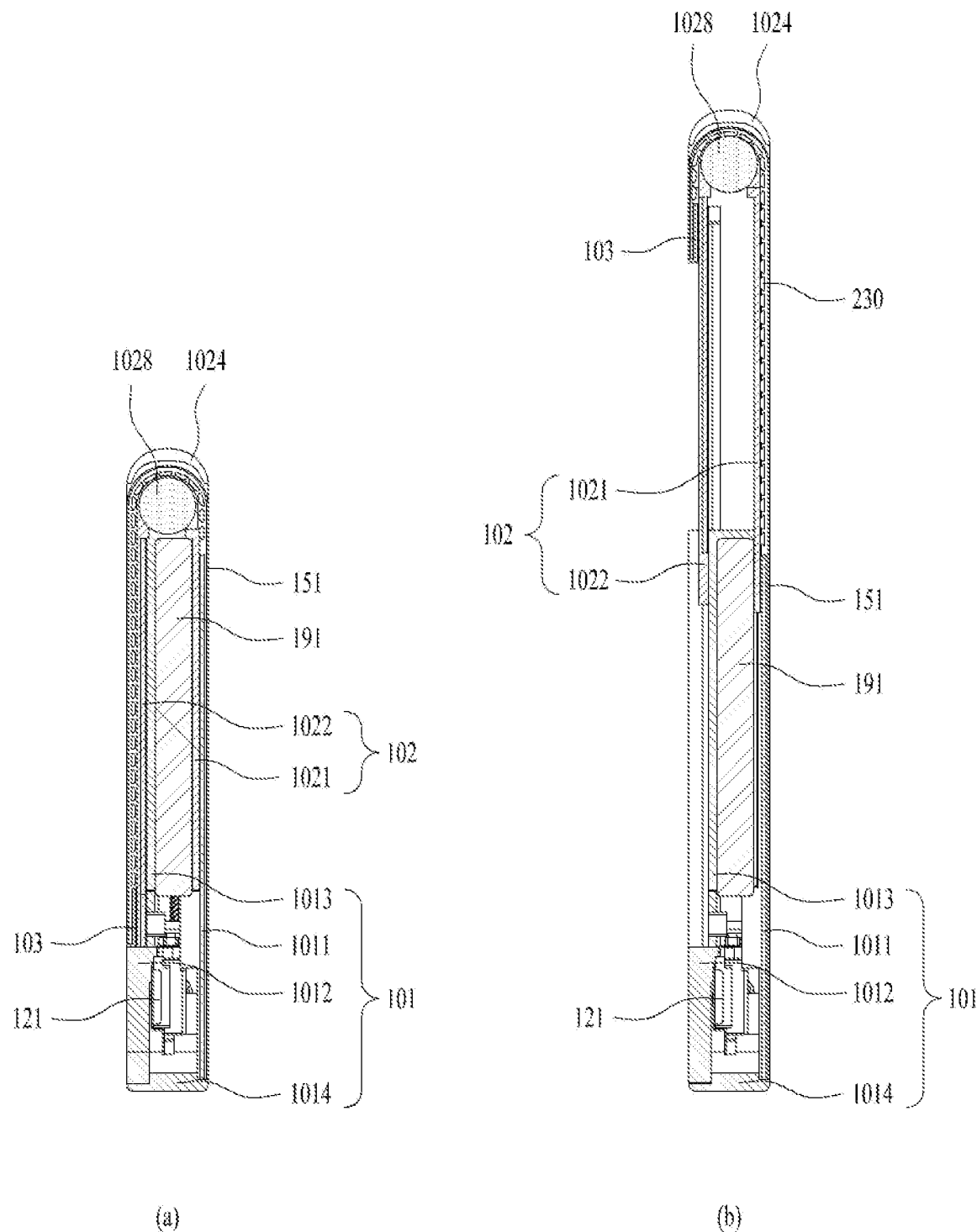
FIG. 5 shows cross-sectional views respectively taken along a line A-A and a line B-B of FIG. 3.

FIG. 2 is an exploded perspective view of a mobile terminal according to one embodiment. Further, FIG. 3 shows perspective views respectively illustrating a first state and a second state viewed from one side of a mobile terminal according to one embodiment. Further, FIG. 4 shows rear face views respectively illustrating a first state and a second state of a mobile terminal according to one embodiment. Further, FIG. 5 shows cross-sectional views respectively taken along a line A-A and a line B-B of FIG. 3. In these drawings, FIGS. 3(a), 4(a), and 5(a) show a first state of the mobile terminal, and FIGS. 3(b), 4(b), and 5(b) show a second state of the mobile terminal.

As shown, a mobile terminal 100 in a first state is contracted, and has a smaller size than the mobile terminal 100 in a second state. In addition, a size of a display unit 151 located disposed on a front face of the mobile terminal 100 also becomes smaller than that of the display unit 151 in the second state. The mobile terminal 100 of the first state is expanded in a first direction D1 to be in the second state. In the second state, the size of the mobile terminal 100 and a size of a front face of the display unit 151 are larger than those in the first state. In a following description, a direction in which the mobile terminal 100 and the display 151 thereof are extended or enlarged is referred to as a first direction D1, a direction in which the mobile terminal 100 and the display 151 thereof are contracted or retracted, or reduce to be converted into the first state from the second state is referred to as a second direction D2, and a direction perpendicular to the first and second directions D1 and D2 is referred to as a third direction.

The mobile terminal 100 of the present disclosure may be converted from the first state in which the display unit 151 is positioned on the front face of a bar-shaped mobile terminal as shown in FIG. 3(a) into the second state as shown in FIG. 3(b) by enlarging a screen thereof. In the second state, an area of the front face of the display unit 151 is enlarged, and an area of a rear face of the display unit 151 is reduced as shown in FIG. 4(b). That is, the display unit 151 positioned on a rear face of the mobile terminal 151 in the first state moves to the front face of the mobile terminal 100 in the second state.

As such, the display unit may use a flexible display unit 151 that may be bent such that the position of the display unit may be varied. The flexible display is a lightweight, unbreakable, and durable display that is built on a thin and flexible substrate that may be bent, crooked, folded, twisted, or rolled while retaining properties of a conventional flat panel display.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color.

The flexible display unit 151 may be in a curved state (e.g., a vertically or horizontally curved state) rather than a flat state in the basic state. In this case, when the external force is applied to the flexible display unit 151, the flexible display unit 151 may be deformed into the flat state (or a less curved state) or more curved state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to third frames 101 to 103 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may be various information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200 to be described later.

The flexible display unit 151 of the present disclosure is bent 180 degrees while being rolled on one of both sides of the mobile terminal 100. Thus, a portion of the display unit 151 is disposed on the front face of the mobile terminal 100 based on such side, and the other portion thereof is disposed on the rear face of the mobile terminal 100. A portion of the display unit 151 located on the front face of the mobile terminal 100 may be fixed to the front face so as not to move. Further, the other portion thereof located on the rear face of the mobile terminal 100 may be movable to the rear face.

In addition, the display unit 151 may be rolled on or released from the side. Accordingly, the portion disposed on the rear face of the mobile terminal 100 moves, so that the size of the portion disposed on the front face of the mobile terminal 100 may be adjusted. Since the area of the flexible display unit 151 is determined and the flexible display unit 151 is formed of one continuous body, an area of the portion on the rear face decreases as an area of the portion on the front face increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

With reference to FIGS. 2 to 5, a detailed configuration of the mobile terminal 100 of the present disclosure will be described in detail below. A following description will be achieved basically with reference to FIG. 2 illustrating an overall configuration. FIGS. 3 to 5 are referred to explain detailed features of corresponding components in the first and second states of the mobile terminal 100.

The mobile terminal 100 of the present disclosure includes a main frame in which components are mounted, and the main frame of the present disclosure may vary in size in the first direction as shown in FIG. 2. One or more frames move relative to each other, and sizes thereof may vary in the first direction. Electronic components are mounted in the main frame, and the flexible display unit 151 is located out of the main frame.

Since the mobile terminal 100 of the present disclosure includes the flexible display unit, the flexible display unit 151 may be combined in a form surrounding a front face and a rear face of the main frame. The main frame may include first to third frames 101 to 103. The main frame may include the first frame 101, the second frame 102 moving in the first direction with respect to the first frame 101, and the third frame 103 moving in the first direction with respect to the second frame 102. The first frame 101 and the second frame 102 include front portions, a rear portions, and side portions, respectively, and are coupled to each other. Thus, the mobile terminal 100 may have a hexahedral outer shape by such coupled first and second frames 101 and 102. In consideration of an illustrated configuration of the first to third frames 101 to 103, movements of the second and third frames 102 and 103 may be a slide movement.

First, the first frame 101 corresponds to a main body of the mobile terminal 100, and may have a space therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and a first rear portion 1012 and a second rear portion 1013 disposed at a rear portion of the mobile terminal.

Such first front portion 1011, first rear portion 1012, and second rear portion 1013 may be respectively formed of plate-shaped members that are generally flat. The first rear portion 1012 and the second rear portion 1013 may be respectively formed of separate members coupled to each other or may be formed of one member as shown. The first front portion 1011 and the first rear portion/second rear portion 1012 and 1013 may be spaced apart from each other at a predetermined spacing to define a predetermined space therebetween, and may be connected to each other by a side portion 1014. The controller 180 and the power supply unit 190 may be accommodated as components of the mobile terminal 100 in the space in the first frame 101. For example, the controller 180 may be a circuit board including a processor and an electronic circuit for controlling the operation of the mobile terminal, and the power supply unit 190 may be a battery and related components. In addition, the second frame 102 and the driving unit 200 to described later may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. When the flexible display unit 151 may be damaged when being bent. Thus, the flexible display unit 151 may be formed to be bent with a predetermined curvature.

The display unit 151 may be divided into a fixed portion and a variable portion. The fixed portion means a portion fixed to the frame. Because of being fixed to the frame, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

A first region of the display unit 151 may be coupled to the first front portion 1011 corresponding to the front face of the mobile terminal 100.

In one example, as shown in FIG. 4, various physical input units 120 for manipulation of the mobile terminal 100 and sensing units 140 may be located on the first rear portion 1012, and the display unit 151 may be disposed only on the second rear portion 1013. Since the first rear portion 1012 does not overlap the flexible display unit 151 regardless of the state of the mobile terminal, and is always exposed to the outside, the input unit 120 such as various buttons, switches, the camera 121, and a flash, and the sensing unit 140 such as a proximity sensor 141 may be arranged on the first rear portion 1012. In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

However, the display unit 151 is positioned both the front face and the rear face of the mobile terminal 100 of the present disclosure. Therefore, when the user captures himself or herself, a display unit on the same face as the camera 121, that is, the portion of the display 151 on the rear face of the mobile terminal 100 in the drawing may be used. Further, when the user captures the object on the opposite side of the user, a display unit on the opposite face of the camera 121, that is, the portion of the display unit 151 on the front face of the mobile terminal 100 in the drawing may be used. For this reason, the mobile terminal 100 may capture the object on the opposite side of the user and capture the user using the single camera 121. The camera may include a plurality of cameras having different angles of view, such as wide angle, super wide angle, and telephotographic cameras. In addition to the camera, a proximity sensor sound output unit may be positioned on the first rear portion 1012, and an antenna 116 may be installed on the first rear portion 1012.

The side portion 1014 may extend along edges of the first front portion 1011 and the first rear portion/second rear portion 1012 and 1013 to surround the first frame 101, and may form the outer shape of the mobile terminal 100. However, as mentioned above, since the second frame 102 is accommodated in the first frame 101 and is movably coupled thereto, in order to allow the movement of the second frame 102 relative to the first frame 101, a portion of the first frame 101 needs to be opened. As shown in FIG. 2, as an example, the second frame 102 is movably coupled to one of both side portions of the first frame 101, so that the side portion 1014 may not be formed on the same side portion, and thus, the portion of the first frame 101 may be opened. Accordingly, the first frame 101 may include a substantially closed first side portion 101a and a second side portion 101b, which is disposed to be opposite to the first side portion 101*a* and is opened. The side portion 1014 is exposed to the outside of the mobile terminal 100, so that an interface unit 160 for connecting a supply port or an ear jack, the user input unit 120 such as a volume button, or the like may be disposed on the side portion 1014. When containing a metal material, the side portion 1014 may serve as an antenna.

The second rear portion 1013 of the first frame 101 may be covered by the display unit, but may be disposed on the front face of the display unit using a transparent material.

The second frame 102 may include a second front portion 1021 disposed at the front portion of the mobile terminal 100 and a third rear portion 1022 disposed at the rear portion of the mobile terminal 100. Like the first front portion 1011 and the first rear portion 1012 of the first frame 101, the second front portion 1021 and the third rear portion 1023 may be formed of plate-shaped members that are generally flat. In addition, the second frame 102 also accommodates various components, and must not interfere with the components accommodated in the first frame 101 during the movement. Accordingly, the second front portion 1021 and the third rear portion 1022 may be coupled to each other in a state of being spaced apart from each other to define a predetermined space therebetween, and may have shapes that do not interfere with the components in the first frame 101.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 1028 rotatably disposed therein. The roller 1028 may be disposed at any position inside the second frame 102. However, the display unit 151 should be spread flat on the front face and the rear face of the mobile terminal 100 to provide a good quality screen to the user. Further, for such spread, a proper tension must be provided on the display unit 151. In order to provide the proper tension, the roller 1028 may be disposed at a first directional end of the second frame 102. The roller 1028 may extend in the third direction, and may be rotatably coupled to the second frame 102.

The display unit 151 may be rolled around the roller 1028 while being gently bent with a predetermined curvature. The flexible display unit 151 may include a first face on which a video is output and exposed to the outside and an inner face facing the frame at the opposite side. The roller 1028 may be installed to rotate freely in the second frame 102 while being in contact with the inner face of the display unit 151. Accordingly, the roller 1028 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (i.e., the first direction D1 or the second direction D2) relative to the second frame 102. The roller 1028 may guide such movement while rotating.

In addition, the roller 1028 is disposed on a first side portion 102*a* of the second frame 102, and the first side portion 102*a* actually corresponds to an outermost side portion of the mobile terminal 100. When the first side portion 102*a* of the second frame 102 is exposed, the display unit 151 rolled on the roller 1028 may be damaged. Accordingly, the second frame 102 may include a side frame 1024 disposed on the first side portion 102*a*.

The side frame 1024 extends in the longitudinal direction of the second frame 102 to cover the first side portion 102*a*, thereby protecting the roller 1028 and the display unit 151 rolled thereon. That is, the side frame 1024 covers the side face of the display unit 151, and the side face thereof is located in the third region. The first to third regions are at specified positions on the flexible display unit and do not change in size or position, but the sizes of the front face and the rear face, and the position of the side face are determined based on the state of the main frame. The first region and the second region correspond to the fixed portion described above, and the third region corresponds to the variable portion described above.

The third region may vary in position depending on the state of the mobile terminal.

Because the side face is rolled by the roller, the side face is bent with the predetermined curvature, and an inner face of the side frame may include a curved face corresponding to the curvature of the side face.

Because of the side frame 1024, the second frame 102 may have the substantially closed first side portion 102*a*, and the side frame 1024 may substantially form the outer shape of the mobile terminal 100 together with the side face 1014 of the first frame 101. In addition, the second frame 102 may include a second side portion 102*b* that is disposed opposite the first side portion 102*a* to minimize interference with the components within the first frame 101 during the movement, and is opened.

Such a second frame 102 is movably coupled to the first frame 101, and thus may slide in the predetermined first or second direction D1 or D2 relative to the first frame 101. More specifically, the second frame 102 may be movably coupled to the first frame 101 through the side portion of the first frame 101, more precisely, through the opened second side portion 101*b*, as shown. More specifically, the second side portion 102*b* of the second frame is disposed relatively adjacent to the first side portion 101*a* of the first frame 101 which is closed. Accordingly, the first side portion 102*a* of the second frame may be disposed to be opposite to the first side portion 101*a*. Accordingly, the second side portion 102*b* is inserted into the first frame 101 through the side portion of the first frame, that is, the second side portion 101*b* thereof. The first side portion 102*a* is not inserted into the first frame 101 but is always located outside the first frame 101, thereby forming the outer shape of the mobile terminal 100 as described above. However, when necessary, such first side portion 102*b* of the second frame 102 may also be inserted into the first frame 101.

Because of such positional relationship, the second frame 102 may extend from or contract to the first frame 101 in a direction perpendicular to the longitudinal direction of the mobile terminal 100 or the first frame 101. That is, the first and second directions D1 and D2 may basically be directions perpendicular to the longitudinal direction of the mobile terminal 100 or the first frame 101. Further, the first and second directions D1 and D2 may also be described as the lateral direction or the horizontal direction of the mobile terminal 100 or the first frame 101. In addition, during the movement in the first direction D1, the second frame 102 extends from the first frame 101. Accordingly, the first direction D1 may be a direction in which the second frame 102 moves away from the first frame 101, that is, moves outwardly of the mobile terminal 100 or the first frame 101. On the other hand, during the movement in the second direction D2, the second frame 102 contracts to the first frame 101. Thus, the second direction D2 is a direction opposite to the first direction D1, so that the second direction D2 may be a direction in which the second frame 102 moves to become closer to the first frame 101, that is, moves inwardly of the mobile terminal 100 or the first frame 101. When being moved in the first direction D1, such second frame 102 extends and applies a force to the portion of the display unit 151 disposed on the rear face of the mobile terminal 100, so that the portion of the display unit 151 may be disposed on the front face of the mobile terminal 100, and a region for such additional arrangement may be defined. Thus, the second frame 102 may convert the mobile terminal 100 into the second state with the display unit 151 with the relatively extended front face by moving in the first direction D1. On the other hand, when being moved in the second direction D2, the second frame 102 contracts into an original state thereof, and applies a force to the portion of the display unit 151 disposed on the front face of the mobile terminal 100 to return to the rear face of the mobile terminal 100 again. Thus, the second frame 102 may convert the mobile terminal 100 into the first state with the display unit 151 with the relatively contracted front face by moving in the second direction D2. Accordingly, the second frame 102 selectively exposes the display unit 151 to the front face of the mobile terminal 100 depending on the moving direction (i.e., the first or second direction D1 and D2). Accordingly, the mobile terminal 100 may be converted into the first or second state defined above.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, as shown in FIG. 5. That is, a front face of the second front portion 1021 may face the rear face of the first front portion 1011. In addition, the rear face of the first front portion 1011 may be in contact with the front face of the second front portion 1021 to stably support the movement of the second frame 102.

The third rear portion 1022 of the second frame 102 may be disposed below the second rear portion 1013 of the first frame 101. That is, the front face of the third rear portion 1022 may face the rear face of the second rear portion 1013. In addition, the rear face of the second rear portion 1013 may be in contact with the front face of the third rear portion 1022 to stably support the movement of the second frame 102. Because of such arrangement, the third rear portion 1022 may be exposed to the outside of the first frame, more precisely, of the second rear portion 1013, and may be coupled to the display unit 151.

Alternatively, when the second rear portion 1013 is made of a transparent material, the second rear portion 1013 may form an outer shape of the rear face of the mobile terminal. The second rear portion 1013 may be positioned rearward of the third rear portion 1022 of the second frame, and the flexible display unit may be disposed between the second rear portion 1013 and the third rear portion 1022 in the first state.

When the second rear portion 1013 is made of a material such as a transparent glass to form the outer shape of the rear face of the mobile terminal, the first rear portion 1012 may be implemented using the same member as the second rear portion 1013. That is, the camera 121, the flash or the sensing unit 140, and the like may be arranged by partially coating the plate-shaped member of the transparent glass material to not allow the internal components to be visible and by not coating only a required portion.

In addition, the second frame 102 may expand and contract the size of the mobile terminal 100 itself, particularly the front face of the mobile terminal 100 by the expansion and the contraction in the first and second directions D1 and D2. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is expanded or contracted. For this reason, the display unit 151 may be movably coupled to the second frame 102. More specifically, the display unit 151 may include a first side edge (or side end) 151d disposed on the front face of the mobile terminal 100 and a second side edge 151e opposite to the first side edge 151d and disposed on the rear face of the mobile terminal 100. The first side edge 151 may be disposed on the front face of the first frame 101, that is, the front face of the first front portion 1011 thereof, and may be disposed adjacent to the side portion of the mobile terminal 100, that is, the first side portion 101a of the first frame. On the other hand, since the second side edge 151e is adjacent to the rear face of the mobile terminal 100 and the third rear portion 1022 of the second frame 102, the second side edge 151e may be coupled the third rear portion 1022 of the second frame 102 to be movable in the first and second directions D1 and D2. In addition, since the display unit 151 is not structurally strong, a third frame 103 may be coupled to the second side edge 151e. The third frame 103 may be formed of a plate-shaped member extending in the longitudinal direction of the mobile terminal 100. Accordingly, the third frame 103 may be coupled to the second frame, that is, the third rear portion 1022 thereof to be movable in the first and second directions D1 and D2 instead of the second side edge 151e. In addition, the second frame 102 may include a slot 1025 extending in the lateral direction of the mobile terminal 100 or the second frame 102, that is, the direction perpendicular to the longitudinal direction thereof. Further, the third frame 103 may be stably moved while being guided by the slot 1025. The third frame 103 may include, for example, a projection inserted into the slot 1025 for the movement along the slot 1025.

Referring to FIGS. 3 to 5, in connection with such configuration of the first to third frames 101, 102, and 103, the display unit 151 may include a first region 1511 extending from one side thereof, that is, the first side edge 151d toward the second side edge 151e by a predetermined length, and a second region 1512 disposed opposite the first region 1511, and extending from the second side edge 151e toward the first side edge 151d by a predetermined length. In addition, the display unit 151 may include a third region 1513 disposed between the first and second regions 1511 and 1512. Such first to third regions 1511, 1512, and 1513 may be connected to each other, and may form a continuous body of the display unit 151. In addition, as described above, for the movement of the third region 1513 toward the front face or the rear face of the mobile terminal 100 depending on the moving direction of the second frame 102, the first region 1511 may be fixed so as not to move to the front face of the mobile terminal 100, and the second region 1512 may be provided to be movable on the rear face of the mobile terminal. Such configuration of the display unit 151 will be described in more detail below.

The first region 1511 may be disposed on the front face of the mobile terminal 100, more specifically, the first frame 101, that is, on the front face of the first front portion 1011. The first region 1511 is fixed to the first frame 101, that is, the front face of the first front portion 1011 so as not to be moved during the movement of the second frame 102, and thus, the first region 1511 may always be exposed to the front face of the mobile terminal 100. The third region 1513 may be adjacent to the first region 1511, and may extend into the second frame 102 and rolled on the roller 1028. The third region 1513 may consecutively extend out of the second frame 102 again and partially cover the second frame 102, that is, the rear face of the third rear portion 1022. Further, the second frame 102, that is, the third rear portion 1022, is adjacent to the first frame 101, that is, the second rear portion 1013 and together forms the rear case of the mobile terminal 100, so that it may be described that the third region 1513 is also disposed on the rear face of the first frame 101.

The second region 1512 may be adjacent to the third region 1513 and may be disposed on the rear face of the mobile terminal 100, more specifically, on the second frame, that is, the rear face of the third rear portion 1022 thereof. The second region 1512 may be coupled to the third frame 103 without being directly coupled to the second frame 102. As shown in FIG. 4 (*b*), the slot 1025 extending in the lateral direction (i.e., the direction perpendicular to the longitudinal direction of the mobile terminal 100) to the second frame 102, that is, to the third rear portion 1022 is defined. Further, the third frame 103 may move along the slot 1025. In FIG. 4(*b*), it is shown that the slot 1025 is defined in the rear face of the second frame 102, but may be defined in the side face of the second frame 102. Although the second region 1512 may move in the first or second direction D1 or D2 with respect to the second frame 102 together with the third frame 103, the movement of the second region 1512 may be restricted within the rear face of the mobile terminal 100 by the slot 1025. That is, the second region 1512 does not move out of the second frame 102 even when the second frame 102 is extended or contracted, and may move along the slot 1025 within the second frame 102 by the extended or contracted distance of the second frame 102. Accordingly, the second region 1512 may always be exposed to the rear face of the mobile terminal 100.

As a result, the first region 1511 may be disposed on the front face of the mobile terminal 100 and may be always exposed to the front face regardless of the movement of the second frame 102, and the second region 1512 may be disposed on the rear face of the mobile terminal 100 and may be always exposed to the rear face regardless of the movement of the second frame 102. In addition, the third region 1513 may be disposed between the first and second regions 1511 and 1512, and may be selectively placed on the front face or the rear face of the mobile terminal 100 depending on the moving directions D1 and D2 of the second frame 102.

Because of such selective placement of the third region 1513, as shown in FIG. 4(*b*), the second rear portion 1013 of the first frame 101 is covered by the second and third regions 1512 and 1513 and the third rear portion 1022 of the display unit 151 in the first state, but the third region 1513 moves to the front face of the mobile terminal 100 in the second state, and the third rear portion 1022 also moves in the first direction D1, so that the mobile terminal 100 may be exposed to the outside. In addition, the second front portion 1021 of the second frame 102 is disposed below the first front portion 1011 of the first frame 101 in the first state, but is moved out of the first frame 101 and supports the third region 1513 of the display unit 151 disposed on the front face of the mobile terminal 100 in the second state.

Since the first and second regions 1511 and 1512 are always respectively arranged on the front face and the rear face of the mobile terminal 100, curvatures of the first region 1511 and the second region 1512 do not change, and the first region 1511 and the second region 1512 may be maintained in a flat basic state. However, the third region 1513 may be rolled on the roller 1028 and bent in the second frame 102. When converting from the first state to the second state, the third region 1513 may extend from the second frame 102 to the front face of the mobile terminal 100 while being rolled on the roller 1028 in one direction. On the other hand, when converting from the second state to the first state, the third region 1513 may be retracted from the front face of the mobile terminal 100 to the second frame 102 while being rolled on the roller 1028 in the opposite direction, and at the same time, may return to the rear face of the mobile terminal 100 from the second frame 102. A specific location of the foldable mobile terminal in a form of being spread like a book is easily damaged because only the specific location is folded repeatedly. On the other hand, the deformed portion of the flexible display unit 151, that is, a portion rolled on the roller 1028, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

As shown in FIGS. 3A, 4A, and 5A, the second frame 102 is fully retracted into the first frame 102 in the first state. Therefore, only the first region 1511 of the display unit 151 fixed to the front face of the first frame 101 may be exposed to the front face of the mobile terminal 100. Such first region 1511 may be fixed and supported to the first frame 101, that is, the first front portion 1011 thereof. In addition, a major portion of the third region 1513 may be disposed on the rear face of the mobile terminal 100 together with the second region 1512, and the third region 1513 may be disposed in the second frame 102 while being partially rolled on the roller 1028. The third region 1513 of the rear face of the mobile terminal 100 may be supported by the second frame, that is, the third rear portion 1022 thereof. The second region 1512 may be fixed by the third frame 103 disposed on the second frame (i.e., the third rear portion 1022) and may be movably coupled to the second frame 1012.

In such first state, when the second frame 102 moves in the first direction D1, the mobile terminal 100 may be converted into the second state. As shown in FIGS. 3B, 4B, and 5B, the second frame 102 may extend from the first frame 101 by the movement in the first direction D1, and may increase the overall size of the mobile terminal 100, in particular, the front face thereof. During the movement in the first direction D1, the second frame 102 may apply a force, that is, a tension, to the display unit 151 in the first direction D1. The display unit 151 is fixed to the first frame 101 but is coupled to the second frame 102 so as to be movable using the third frame 103, so that the force applied by the second frame 102 allows the third region 1513 to be rolled out from the roller 1028 of the second frame 102 to the front face of the mobile terminal 100. That is, the third region 1513 may be withdrawn (or pulled out) from the second frame 102 or extend to (or move out of) the second frame 102. At the same time, the third region 1513, particularly, the portion located on the rear face of the third region 1513 may be rolled into the roller 1028 of the second frame 102 from the rear face, or may be inserted (or pushed in), retracted, or moved into the second frame 102. Not an entirety of the third region 1513 is withdrawn from the second frame 102 to the front face of the mobile terminal 100, and a portion of the third region 1513 may be disposed in the second frame 102 while still being rolled on the roller 1028. In addition, for the smooth movement of the third region 1513, the second region 1512 may also move in the first direction D1 with respect to the second frame 102 together with the third frame 103. In addition, as described above, the second region 1512 and the third frame 103 may be constrained to the second frame 102 and move in the first direction D1 with respect to the first frame 101 together with the second frame 102. Accordingly, the second region 1512 and the third frame 103 may move in the first direction D1 relative to the first frame 101 as well as the second frame 102, and accordingly, move a distance longer than the moved distance of the second frame 102. Thus, because of such long distance movement in the first direction D1 of the second region 1512, the third region 1513 may be smoothly extended to the front face of the mobile terminal 100. Further, for the movement of the third region 1513, which is proportional to the expansion of the second frame 102, the movement of the second region 1512 and the third frame 103 in the first direction D1 may be performed simultaneously with the movement of such third region 1512 and second frame 102 in the first direction D1 so as to be proportional to the movement of third region 1513 and second frame 102.

When the second frame 102 is fully extended in the first direction D1, the first and third regions 1511 and 1513 may be arranged on the front face of the mobile terminal 100, and only the second region 1512 may be disposed on the rear face of the mobile terminal 100. Such first and third regions 1511 and 1513 may be supported by the first frame (i.e., the first front portion 1011 thereof) and the second frame (i.e., the second front portion 1021 thereof). In addition, the second frame 102, i.e., the third rear portion 1022 thereof exposes the second rear portion 1013 of the first frame while extending in the first direction D1, and supports the moving third region 1513. Therefore, in the second state, the mobile terminal 100 may have the extended front face display unit 151.

On the other hand, when the second frame 102 moves in the second direction D2 in the second state, the mobile terminal 100 may again return into the first state as shown in FIGS. 3A, 4A, and 5A. The second frame 102 may be contracted to the first frame 101 by the movement in the second direction D2, and may reduce the overall size of the mobile terminal 100, particularly the front face thereof. The movement of the display unit 151 during such movement of the second frame 102 may be performed in a reverse order of the movement in the first direction D1 described above. In brief, the third region 1513 may be rolled from the front face of the mobile terminal 100 into the roller 1028 of the second frame 102, or may be inserted, retracted, or moved into the second frame 102. At the same time, the third region 1513 may be rolled, withdrawn, extended, or moved out of the roller 1028 of the second frame 102 to the rear face of the mobile terminal 100. Not the entirety of the third region 1513 may be withdrawn from the second frame 102 to the rear face of the mobile terminal 100, and the portion of the third region 1513 may still be placed in the second frame 102 while still being rolled on the roller 1028. In addition, for such smooth movement of the third region 1513, the second region 1512 may also move in the second direction D2 with respect to the second frame 102 together with the third frame 103. The second region 1512 and the third frame 103 may be constrained to the second frame 102 to move in the second direction D2 with respect to the first frame 101 together with the second frame 102. Accordingly, the second region 1512 and the third frame 103 may move relatively in the second direction D2 with respect to not only the second frame 102 but also the first frame 101. As a result, the second region 1512 and the third frame 103 may move in the second direction D2 a distance larger than the moved distance of the second frame 102. Thus, because of such long distance movement of the second region 1512, the third region 1513 may be smoothly returned to the rear face of the mobile terminal 100. Further, for the movement of the third region 1513 proportional to the contraction of the second frame 102, the movements of the second region 1512 and the third frame 103 in the second direction D2 may be performed simultaneously with the movements of the third region 1512 and the second frame 102 in the second direction D2 to be proportional to the movements of the third region 1513 and the second frame 102. When the second frame 102 is completely contracted in the second direction D2, the mobile terminal 100 may be converted into the first state as described above, and may have the display unit 151 with the front face that is relatively reduced in comparison with the second state in the first state.

Figure 6:
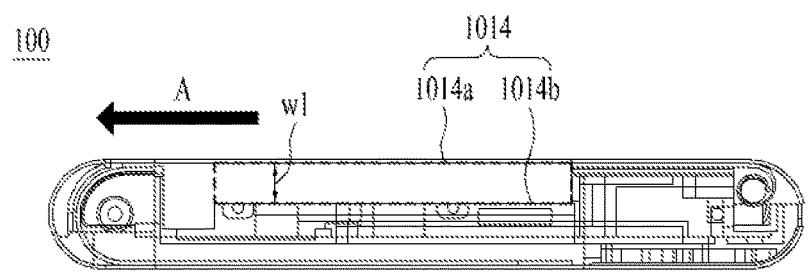
FIG. 6 is a side view of a mobile terminal according to an embodiment.
Figure 6:
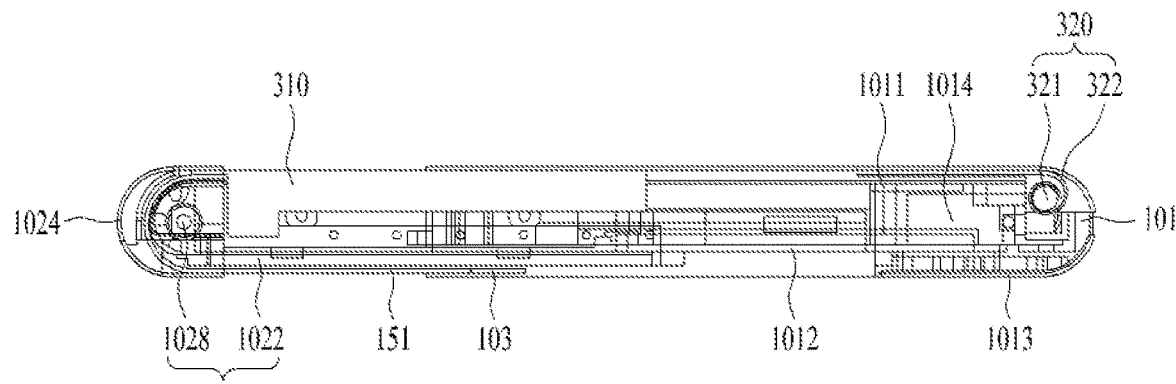
Figure 6:
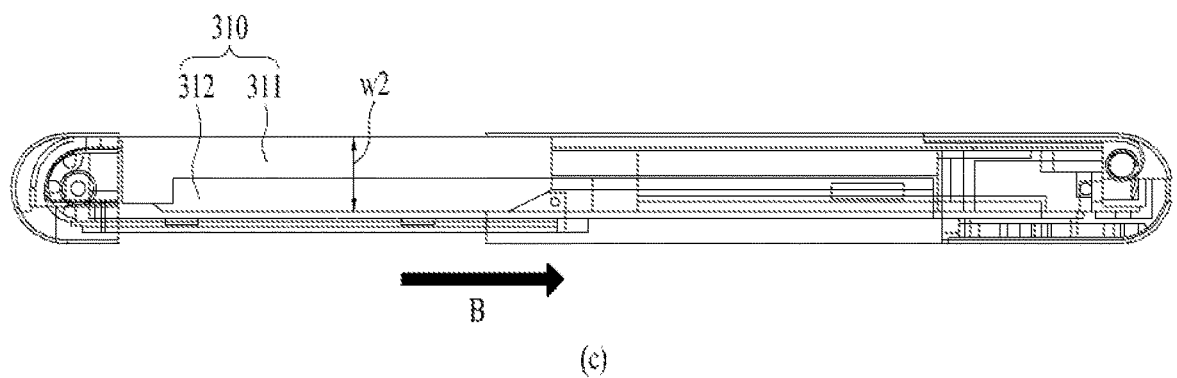

FIG. 6 is a side view showing a partial configuration of a mobile terminal according to an embodiment viewed from one side.

The mobile terminal 100 according to an embodiment may include the first frame 101, the second frame 102, the third frame 103, a flexible display panel 151, the driving unit 200 (see FIG. 2), and a side cover 310.

The first frame 101 may include: a first front portion 1011 disposed in the front; and a first rear portion 1012 and a second rear portion 1013 disposed in the rear. The first rear portion 1012 may be disposed in front of the second rear portion 1013. In some cases, the first rear portion 1012 and the second rear portion 1013 may be disposed on the same plane. The first front portion 1011 and the second rear portion 1012 (and the second rear portion 1013) may be spaced apart and connected by a side portion 1014 to form an internal mounting space. The side portion 1014 may be omitted in a first direction A so that the first frame 101 may include an opening in the first direction A.

The second frame 102 may include: a third rear portion 1022 provided on the rear surface of the first frame 101 and movably coupled in the first direction A; and a first roller 1028 provided at the end of the third rear portion 1022 in the first direction A. Specifically, the third rear portion 1022 may be configured to be movable in the first direction A or a second direction B along the rear surface of the first rear portion 1012. The first roller 1028 may be provided at the end of the front surface of the third rear portion 102 in the first direction A. The second frame 102 may further include the side frame 1024 configured to surround the first roller 1028 in order to prevent the first roller 1028 from being exposed.

The third frame 103 may be configured to be movable in the first direction A or the second direction B along the rear surface of the third rear portion 1022.

The flexible display panel 151 may be configured to surround the first roller 1028. Specifically, one end thereof may be fixed to the front side of the first frame 101, and the other end may be fixed to the third frame 103. In particular, the flexible display panel 151 may be configured to pass through a space between the first roller 1028 and the side frame 1024. The flexible display panel 151 may have a different area exposed to the front depending on the state of the mobile terminal. Specifically, FIG. 6(a) shows a first state of the mobile terminal. The first state may be a state in which the second frame 102 maximally moves in the second direction B with respect to the first frame 101. In the first state, the flexible display panel 151 may have the smallest area exposed to the front. FIG. 6(c) shows a second state of the mobile terminal. The second state may be a state in which the second frame 102 maximally moves in the first direction A with respect to the first frame 101. In the second state, the flexible display panel 151 may have the largest area exposed to the front. FIG. 6(b) shows a transition state between the first state and the second state.

The driving unit 200 may move the second frame 102 in the first direction A or the second direction B from the first frame 101. The driving unit 200 may be provided in a mounting space formed by the first frame 101. In some cases, the driving unit 200 may be provided on the third rear portion 1022.

The side cover 310 may be configured to extend in the second direction B from both sides of the first roller 1028. The side cover 310 may be configured to move along the outer or inner surface of the side portion 1014 of the first frame 101. When the mobile terminal 100 is in the second state or when the mobile terminal transitions from the first state to the second state, the side cover 310 may function to cover the internal configuration of the mobile terminal 100 from being exposed to sides. However, a general drawer-type structure may limit the functions of hardware provided in the first frame 101. Herein, the drawer-type structure may be a structure in which the front-rear width of the side cover 310 corresponds to the front-rear width of the inner surface of the side portion 1014 of the first frame 101.

The hardware provided in the first frame 101 may perform proper functions by means of the side portion 1014 of the first frame 101. For example, an antenna provided in the first frame 101 may be connected to the side portion 1014 made of metal to perform proper functions. In addition, a speaker provided in the first frame 101 may emit sound through a conduit provided in the side portion 1014. In the drawer-type structure, when the mobile terminal 100 transitions to the first state, the side cover 310 may overlap with the side portion 1014. As a result, a structure in which the antenna or speaker provided in the first frame 101 is connected to the side portion 1014 of the first frame 101 may be restricted.

Accordingly, in the mobile terminal 100 according to an embodiment, the front-rear width of the side cover 310 may be configured to be variable depending on the position of the second frame 102. Specifically, a width w1 of the side cover 310 in the second state may be wider than a width w1 of the side cover 310 in the first state.

Specifically, the side cover 310 may include a first plate 311 fixed to both sides of the first roller 1028 and a second plate 312 moving forward and backward from the first plate 311. When the second frame 102 moves in the second direction B, the second plate 312 may move forward so that the second plate 312 may overlap with the first plate 311.

When the second frame 102 moves in the first direction A, the second plate 312 may move backward. When the second frame 102 moves in the second direction B, the side portion 1014 of the first frame 101 may include: a front side portion 1014a that overlaps with the side cover 310; and a rear side portion 1014b that does not overlap with the side cover 310. Some hardware provided in the first frame 101 may perform proper functions by means of the rear side portion 1014b.

Figure 7:
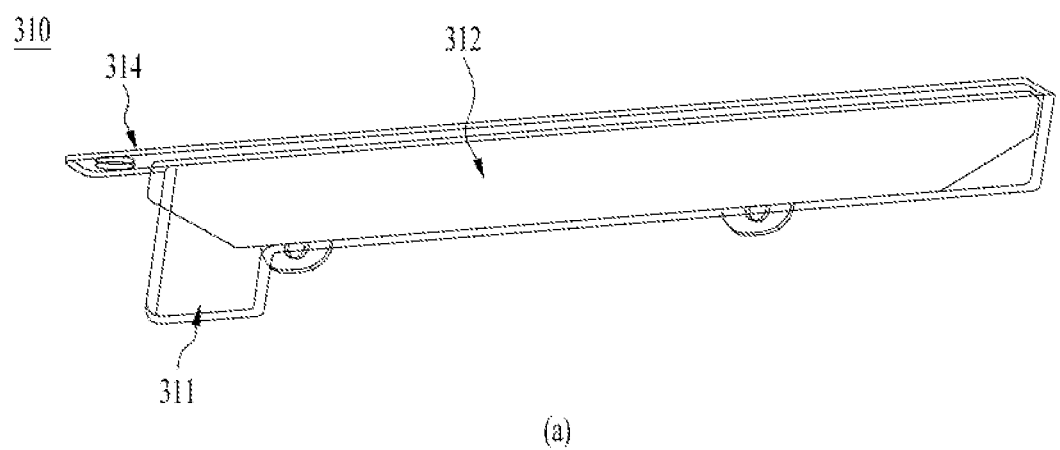
FIG. 7 is a perspective view showing a partial configuration of a mobile terminal according to an embodiment.
Figure 7:
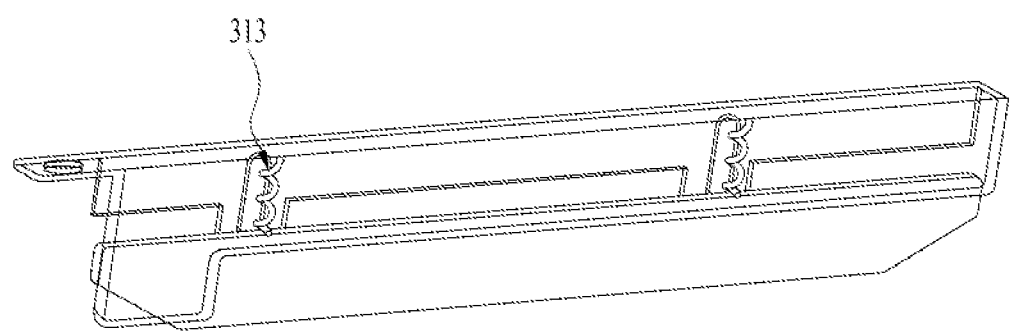

FIG. 7 is a perspective view showing a partial configuration of a mobile terminal according to an embodiment. Specifically, FIG. 7 shows the configuration of the side cover 310 of the mobile terminal 100 viewed from different directions.

The side cover 310 may include the first plate 311 serving as a main body and a second plate 312 configured to be movable forward and backward from the first plate 311. Specifically, FIG. 7(a) shows a state in which the second plate 312 moves forward, and FIG. 7(b) shows a state in which the second plate 312 moves backward.

The second plate 312 may move forward and backward along the inner surface of the first plate 311. Additionally, the second plate 312 may be coupled to the first plate 311 by a spring member 313, which is elastically supported backward.

The first plate 311 may include fixing parts 314 respectively fixed to both sides of the first roller 1028. In some cases, the fixing part 314 may be fixed to the side frame 1024. Alternatively, the fixing part 314 may be fixed to a support part supporting the axis of the first roller 1028. Herein, the support part may be configured to be fixed to the third rear portion 1022.

Figure 8:
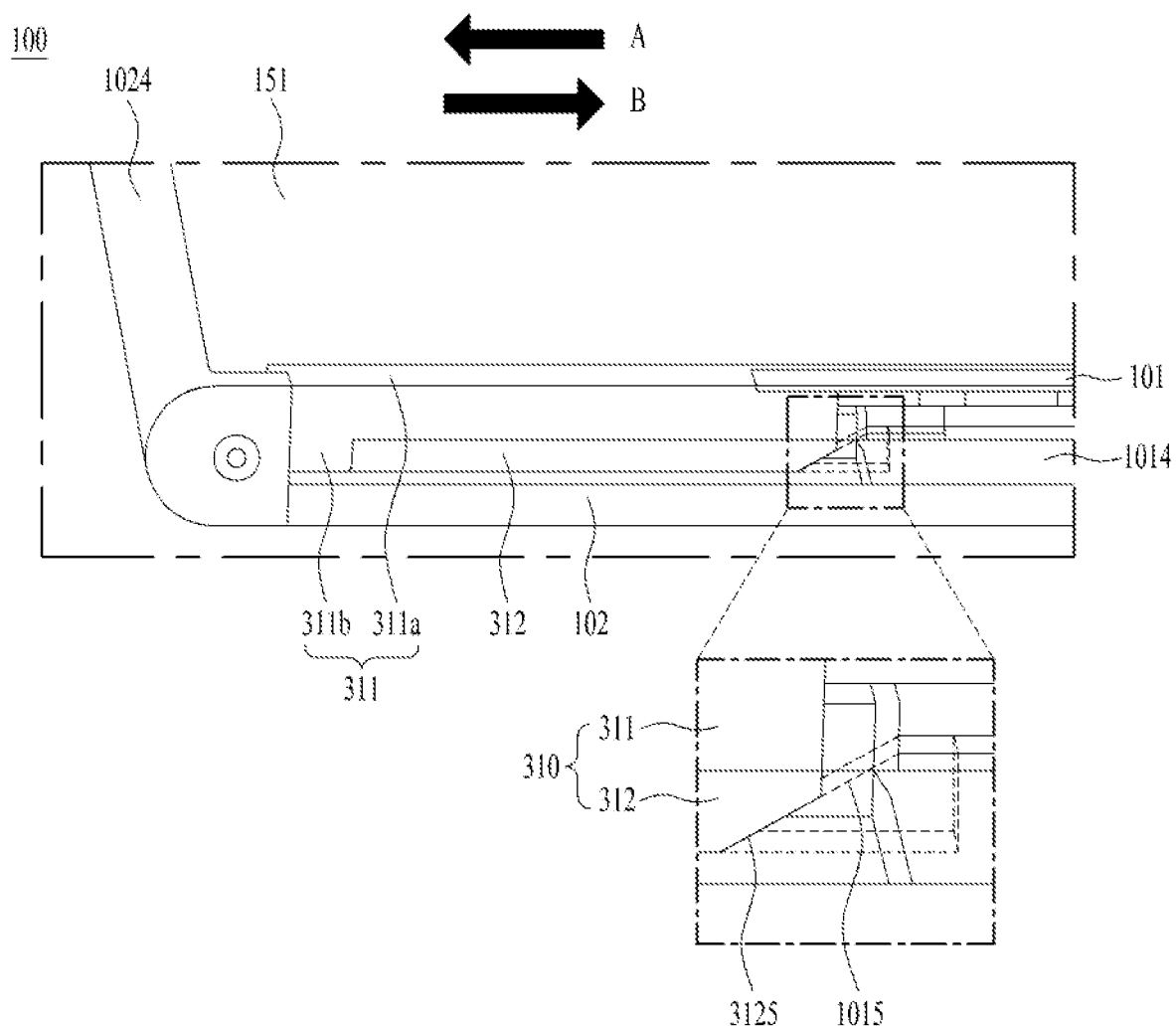
FIG. 8 shows a side view and an enlarged view of a mobile terminal according to an embodiment.

FIG. 8 is a perspective view showing a partial configuration of a mobile terminal according to an embodiment viewed from one side. Specifically, FIG. 8 shows a state corresponding to FIG. 6(c).

When the second frame 102 moves in the second direction B, the first frame 101 may include an inclined surface 1015 configured to guide the second plate 312 forward. Specifically, when the second frame 102 moves in the second direction B while the mobile terminal 100 is in the second state. The second plate 312 may move forward along the inclined surface 1015 provided in the first frame 101 so that the second plate 312 may overlap with the first plate 311.

The second plate 312 may include an inclined surface 312S at the end thereof in the second direction B to ascend along the inclined surface 1015 provided in the first frame 101. In this case, in the second state, the inclined surface 312S of the second plate 312 may be provided on the inner surface of the side portion 1014 of the first frame 101 so as not to be exposed to the outside. The inclined surface 1015 of the first frame 101 may also be provided on the inner surface of the side portion 1014 of the first frame 101.

The first plate 311 may include a front portion 311a provided on the edge of the flexible display panel 151 and a side portion 311b provided perpendicular to the front portion 311a. The second plate 312 may move forward and backward along the inner surface of the side portion 311b. Herein, the front portion 311a may serve to press the flexible display panel 151. A part of the flexible display panel 151, which is adjacent to a part wrapped around the first roller 1028, may be lifted. The first plate 311 may prevent the flexible display panel 151 from being lifted by pressing the edge of the corresponding part.

Figure 9:
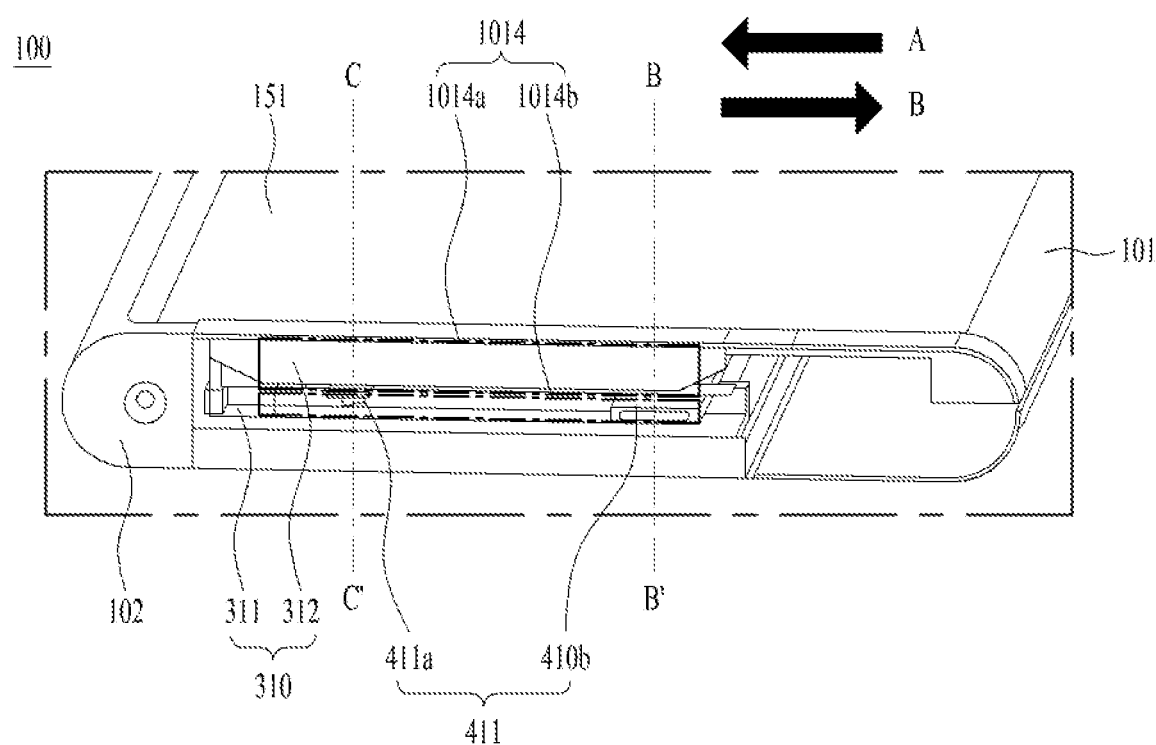
FIG. 9 shows an internal structure of a mobile terminal according to an embodiment.

FIG. 9 is a perspective view showing a partial configuration of a mobile terminal according to an embodiment viewed from one side. Specifically, FIG. 9 shows a state corresponding to FIG. 6(a).

The first frame 101 may form a mounting space for accommodating at least one electronic component 411. In some cases, the mounting space may be separated from the outside by the flexible display panel 151.

The electronic component 411 provided in the first frame 101 may perform proper functions by means of the side portion 1014 of the first frame 101. In the first state, the side cover 310 may form an area for directly connecting the side portion 1014 of the first frame 101 and the electronic component 411. The electronic component 411 provided in the first frame 101 may perform the proper functions by means of the area.

When the second frame 102 moves in the second direction B, the side portion 1014 of the first frame 101 may include: the front side portion 1014a that overlaps with the side cover 310; and the rear side portion 1014b that does not overlap with the side cover 310.

Specifically, the front side portion 1014a may correspond to a part of the side portion 1014 of the first frame 101 that overlaps with the first plate 311 or a part of the side portion 1014 of the first frame 101 that overlaps with the first plate 311 and the second plate 312. The rear side portion 1014b may correspond to a part of the side portion 1014 of the first frame 101 that does not overlap with the side cover 310. Specifically, the rear side portion 1014b may correspond to a part obtained by moving the second plate 312 forward.

Figure 10:
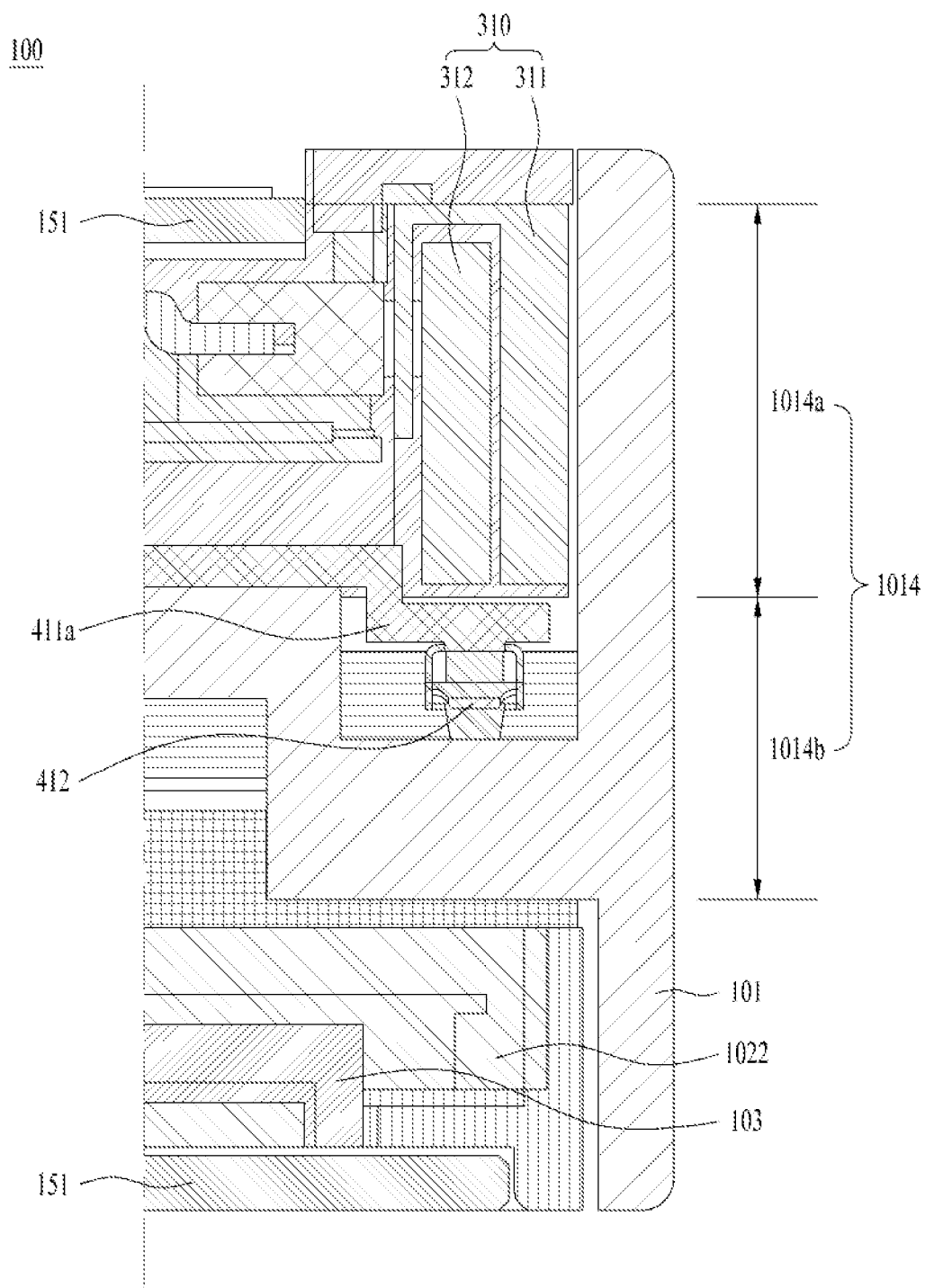
FIG. 10 is a cross-sectional view in a direction C-C' of FIG. 9.

FIG. 10 is a cross-sectional view taken along a line C-C' of FIG. 9.

The mobile terminal 100 according to an embodiment may include an antenna 411a in the internal mounting space formed by the first frame 101. At least part of the side portion 1014 of the first frame 101 may be made of metal, and the antenna 411a may be connected to the metal part of the side portion 1014 by a clip 412.

The part in which the antenna 411a is connected to the side portion 1014 of the first frame 101 by the clip 412 may be a part corresponding to the rear side portion 1014b. Specifically, the side cover 310 may be concentrated in a part corresponding to the front side portion 1014a, and the antenna 411a may be connected close to the rear side portion 1014b, which is made of metal. That is, the antenna 411a may be connected close to the rear side portion 1014b so that the antenna 411a may receive signals clearly through the rear side portion 1014b.

Figure 11:
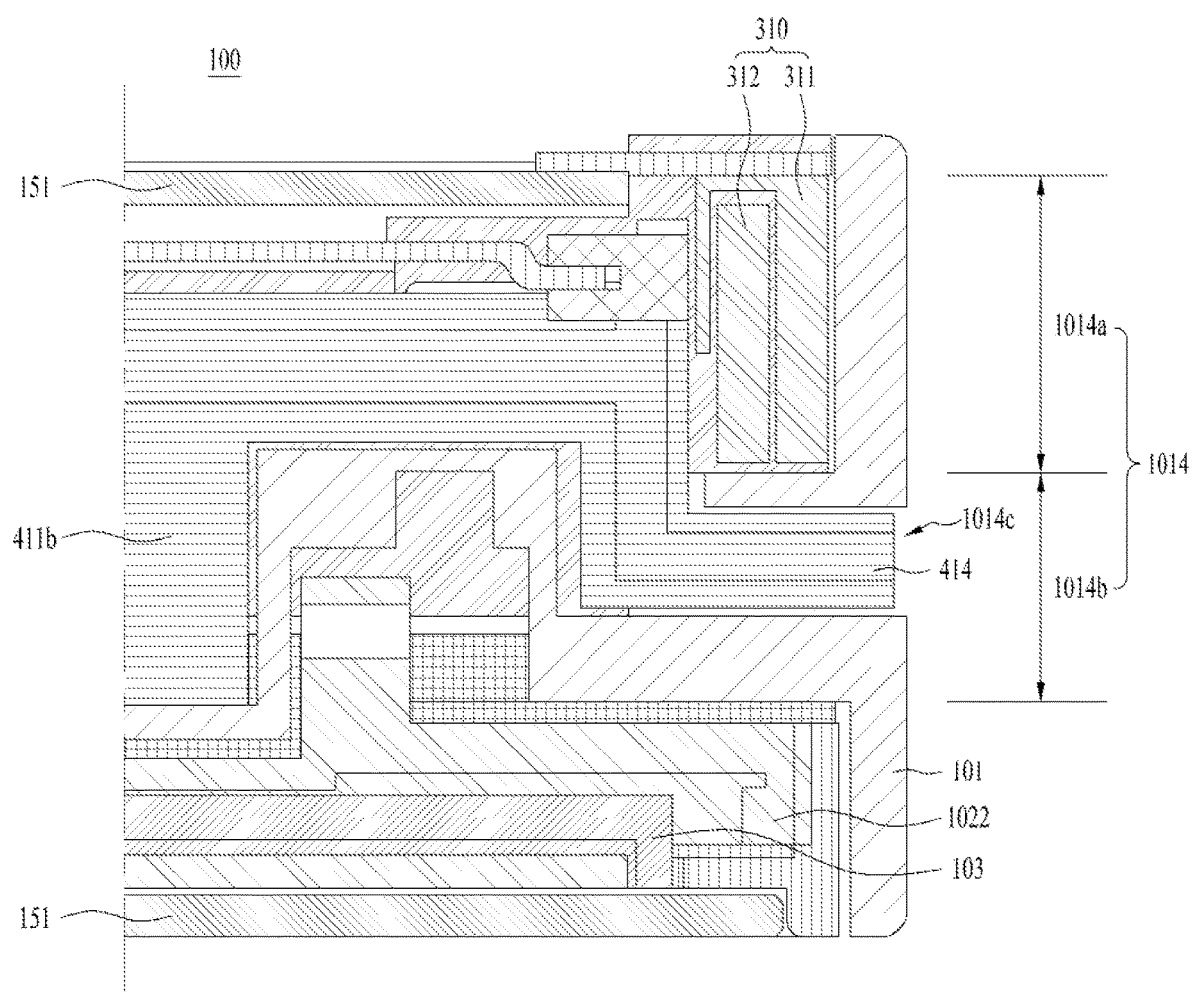
FIG. 11 is a cross-sectional view in a direction D-D' of FIG. 9.

FIG. 11 is a cross-sectional view along a direction D-D' of FIG. 9.

The mobile terminal 100 according to an embodiment may include a speaker 411b in the internal mounting space formed by the first frame 101. A hole 1014c may be included in at least part of the side portion 1014 of the first frame 101. The speaker 411 may connect the conduit 414 through which sound moves to the hole 1014c provided in the side portion 1014.

The hole 1014c connected to the conduit 414 of the speaker 411 may be provided in the rear side portion 1014b of the side portion 1014 of the first frame 101. Specifically, the side cover 310 may be concentrated in a part corresponding to the front side portion 1014a, and a space in which the conduit 414 is provided may be obtained by a part corresponding to the rear side portion 1014b. That is, the conduit 414 of the speaker 411 may be directly connected to the outside through the hole 1014c provided in the rear side portion 1014b so that the speaker 411 may emit clearer sound.

Figure 12:
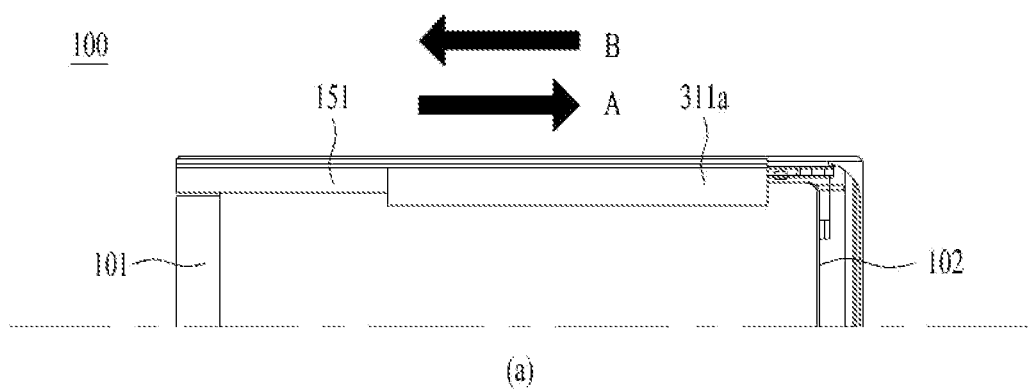
FIG. 12 is a front view showing a part of a mobile terminal according to an embodiment.
Figure 12:
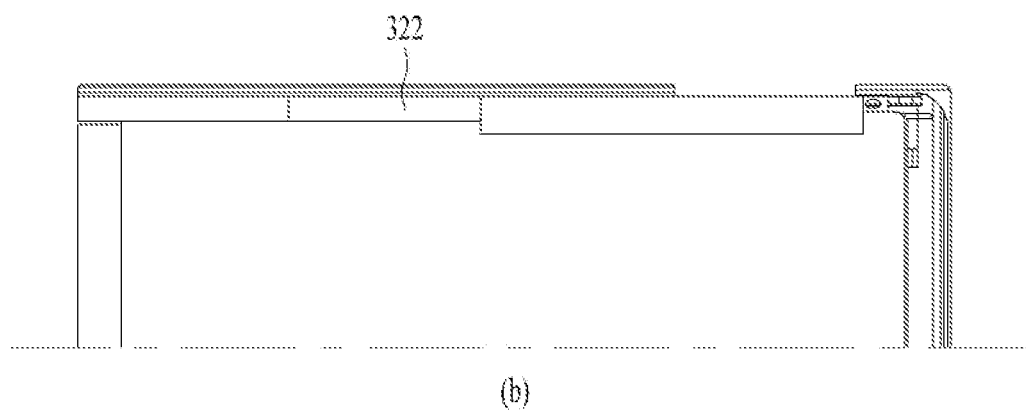
Figure 12:
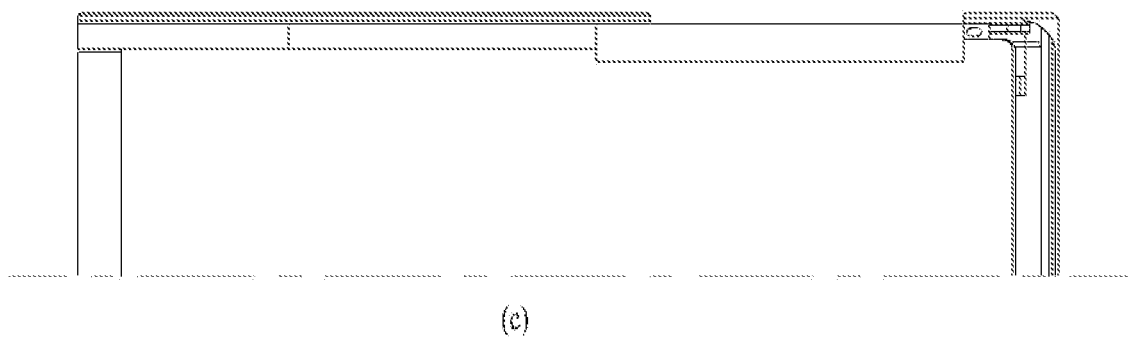

FIG. 12 is a front view showing a part of a mobile terminal according to an embodiment. Specifically, FIGS. 12(a) to 12(c) may correspond to FIGS. 6(a) to 6(c), respectively. Hereinafter, a description is given with reference to FIG. 6.

The side cover 310 may include: the first plate 311 fixed to both sides of the first roller 1028 and provided in the first direction A; and the second plate 312 configured to move forward and backward from the first plate 311. Herein, the first plate 311 may include: the front portion 311a configured to press the front edge of the flexible display panel 151; and the side portion 311b provided perpendicular to the front portion 311a in contact with the second plate 312 as shown in FIG. 8.

When the second frame 102 moves in the first direction A, the front portion 311a may also move in the first direction A. In this case, the edge of the flexible display panel 151 may be exposed from the front. To prevent this problem, the first flame 101 may include a spiral spring 322 that is connected to the end of the front portion 311a in the second direction B, released when the front portion 311a moves in the first direction A, and wound when the front portion 311a moves in the second direction B.

Specifically, the spiral spring 322 may be provided to be wound around or unwound from a fixed shaft 321 provided in the first frame 101. An unwound part of the spiral spring 322 may be provided at the edge of the flexible display panel 151.

In this case, the spiral spring 322 may be a constant force spring that provides a constant tension regardless of the degree of unwinding. The constant force spring may be a spring that provides a constant tension in the unwinding direction even when the spiral spring 322 is unwound or wound.

In this case, the spiral spring 322 may have the same width as the front portion 311a. When the front portion 311a moves in the first direction A or the second direction B, scratching may occur in the flexible display panel 151. Accordingly, when the spiral spring 322 has the same width as the front portion 311a, it is possible to prevent the scratching of the flexible display panel 151 from being exposed.

The above-described details need to be construed as illustrative and not restrictive in all aspects. The scope of the present disclosure needs to be determined by reasonable interpretation of the appended claims. In addition, the present disclosure covers the modifications and variations of this disclosure that come within the scope of the appended claims and their equivalents.

What is claimed is:

1. A mobile terminal comprising:
   a first frame comprising a first front portion and a first rear portion;
   a second frame coupled to the first frame to be movable in a first direction of the first frame, the second frame comprising a second front portion, a third rear portion and a first roller disposed at an end of the third rear portion in the first direction;
   a third frame coupled to a rear face of the third rear portion of the second frame and configured to move in the first direction;
   a flexible display panel surrounding the first roller, wherein one end thereof is disposed on the front portion of the first frame and another end is disposed on the third frame;
   a driver configured to drive the second frame from the first frame in the first direction or in a second direction opposite to the first direction; and a side cover disposed at a side of the second frame in a third direction perpendicular to the first direction, and comprising a first plate extending in the second direction from a side of the first roller in the third direction and a second plate configured to move forward and backward from the first plate, wherein the second plate is configured to move forward to overlap with the first plate when the second frame moves in the second direction, and move backward when the second frame moves in the first direction.

2. The mobile terminal of claim 1, wherein the first frame comprises an inclined surface configured to guide the second plate forward based on movement of the second frame in the second direction.

3. The mobile terminal of claim 1, wherein the side cover further comprises a spring member configured to elastically support the second plate backward.

4. The mobile terminal of claim 1, wherein a side portion of the first frame comprises:
 a front side portion configured to overlap with the side cover based on movement of the second frame in the second direction; and
 a rear side portion configured not to overlap with the side cover.

5. The mobile terminal of claim 4, wherein the rear side portion is made of metal, and wherein the first frame is provided with an antenna connected directly to or adjacent to the rear side portion.

6. The mobile terminal of claim 4, wherein the first frame is provided with a speaker module configured to output sound through a conduit disposed in the rear side portion.

7. The mobile terminal of claim 1, wherein the first plate comprises:
 a front portion disposed on an edge of the flexible display panel; and
 a side portion disposed perpendicular to the front portion and connected to the second plate.

8. The mobile terminal of claim 7, wherein the first frame comprises a spiral spring connected to an end of the front portion in the second direction, unwound based on a movement of the front portion in the first direction, and wound based on a movement of the front portion in the second direction.

9. The mobile terminal of claim 8, wherein an unwound part of the spiral spring is disposed on the edge of the flexible display panel.

10. The mobile terminal of claim 8, wherein the spiral spring is a constant force spring configured to provide a constant tension regardless of degree of unwinding.

11. The mobile terminal of claim 8, wherein the spiral spring has a same width as the front portion.

* * * * *